J. BAHNER.
CORN PLANTER.
APPLICATION FILED JULY 28, 1913.
1,095,136.
Patented Apr. 28, 1914.
2 SHEETS—SHEET 1.
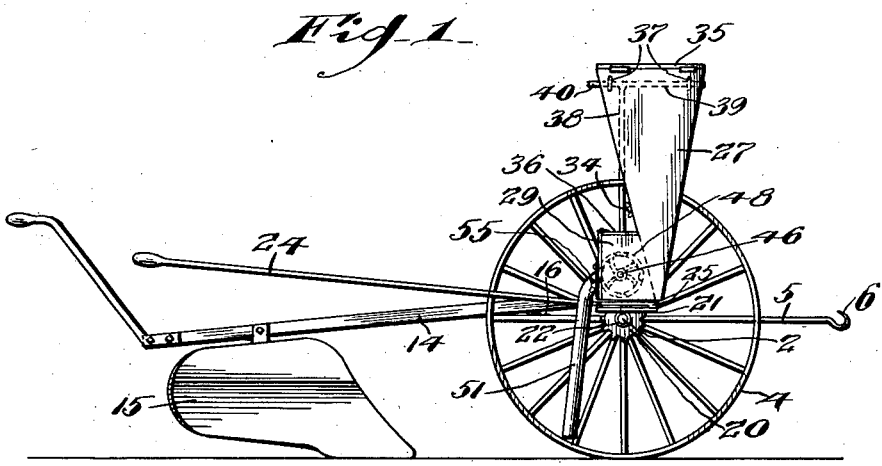
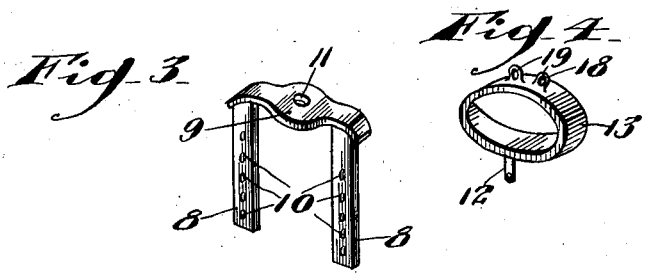
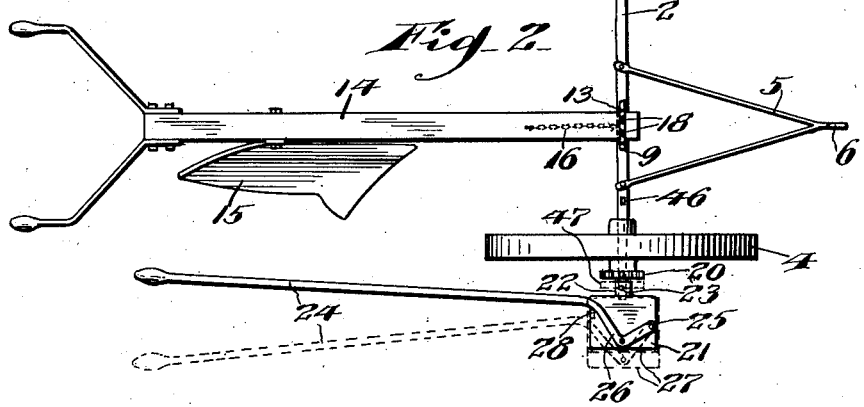
WITNESSES:
INVENTOR
Joseph Bahner,
BY
W. W. Williamson
ATTORNEY.
COLUMBIA PLANOGRAPH CO., WASHINGTON, D. C.

J. BAHNER.
CORN PLANTER.
APPLICATION FILED JULY 28, 1913.
1,095,136.
Patented Apr. 28, 1914.
2 SHEETS—SHEET 2.
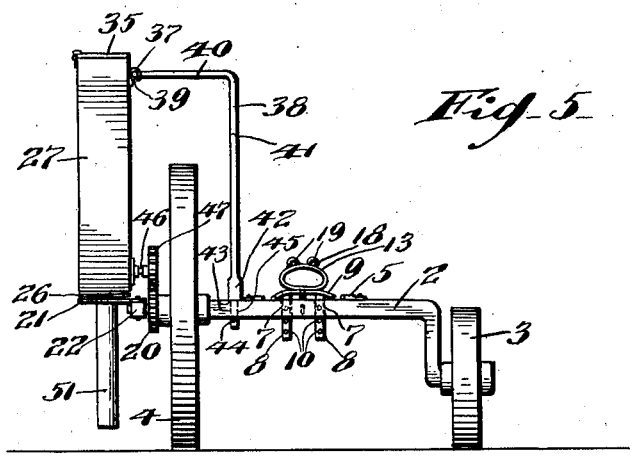
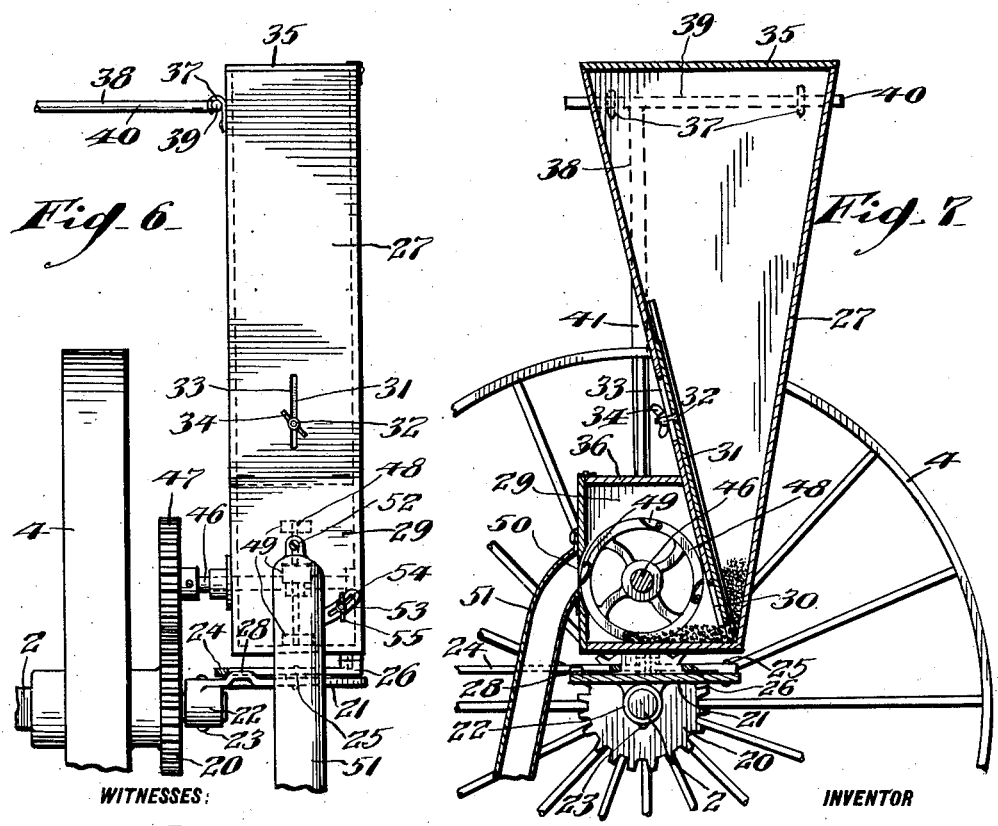
WITNESSES:
INVENTOR
Joseph Bahner,
BY W. W. Williamson
ATTORNEY.

UNITED STATES PATENT OFFICE.

JOSEPH BAHNER, OF PHILADELPHIA, PENNSYLVANIA.

CORN-PLANTER.

1,095,136.  Specification of Letters Patent.  Patented Apr. 28, 1914.

Application filed July 28, 1913. Serial No. 781,692.

*To all whom it may concern:*

Be it known that I, JOSEPH BAHNER, subject of the King of Hungary, residing at Philadelphia, in the county of Philadelphia and State of Pennsylvania, have invented new and useful Improvements in Corn-Planters, of which the following is a specification.

My invention relates to new and useful improvements in corn planters, and has for its object to provide an exceedingly simple and effective device of this character, whereby a plow may be readily and quickly attached thereto or detached therefrom, said plow adapted to open a furrow and throw the soil therefrom into the preceding furrow for covering the seeds which have been dropped therein.

A still further object of the invention is to provide a seed hopper provided with means for dropping the seeds at predetermined distances, said hopper being so mounted that the lower end thereof may be swung to put the sowing mechanism in and out of operation.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1, is a side elevation of my improved corn planter showing a plow fastened thereto. Fig. 2, is a plan view thereof, the hopper being removed. Fig. 3, is an enlarged perspective view of the adjustable socket plate. Fig. 4, is a similar view of the socket. Fig. 5, is a front elevation of the corn planter showing the plow removed. Fig. 6, is an enlarged rear view of the hopper and its adjacent fixtures; and Fig. 7, is a longitudinal vertical sectional view through the hopper.

In carrying out my invention as here embodied, 2 represents an axle having wheels 3 and 4 journaled thereon and having a draft bar 5 permanently attached thereto, which is provided with a hooked end 6 for attachment to a swingle tree. The draft rod is preferably made V shape, having its two ends fastened to the axle and between the points where the draft rod is fastened to the axle, said axle is provided with a pair of vertical openings 7 in which fit the arms 8 of the socket plate 9, said arms having a plurality of openings therein, through which may be passed pins for adjustably securing said socket plate to the axle. In the socket plate 9 is formed a central opening 11 through which passes the pivot pin 12 of smaller diameter than the opening 11, said pivot pin 12 being carried by the socket 13, whereby said socket is rotatably mounted upon the socket plate. The socket 13 is curved so as to rock slightly upon the socket plate. The plow beam 14 of the plow 15 sits within the socket 13, and the socket is of such size to permit the plow beam to rotate therein, so that when the plow is not in use it may be readily thrown over upon its side. The plow is secured to the planter by means of a chain 16 which is fastened to some suitable part of the plow beam and the axle 2. The socket 13 is provided with ears 18 having holes 19 therein which act as guides. On the hub of the wheel 4 is securely mounted a gear wheel 20 and on the outer end of the axle which projects beyond the hub of said wheel 4 is mounted a plate 21 by means of a socket 22 which is held in place by a pin 23 passing through said socket and the end of the axle. To the plate 21 is pivoted the lever 24 at 25, said lever having an offset 26 at which point it is pivoted to the lower end of the hopper 27 and in order that the lever may be held in its different adjusted positions, I provide one edge of the plate 21 with a lug 28, so that said lever may rest on either side thereof and be held in that position until changed by the operator, which change may be accomplished by raising the lever 24. The hopper 27 is preferably constructed so that its front and rear side walls converge toward the lower end and from the rear wall at the lower end of the hopper projects a housing 29 which is in communication with the interior of the hopper through an opening 30 at the lower end of the rear wall of said hopper, and this opening is adapted to be closed or opened by the slide 31 which carries a bolt 32 projecting through a slot 33 in the rear wall of said hopper, and on this bolt is threaded a nut 34, so that the slide may be held in its adjusted position.

The hopper and housing are each provided with a hinged cover 35 and 36 respectively. The hopper is provided with hooks 37 secured to one of its sides adjacent its upper end, and these hooks are adapted to engage the bracket 38 comprising a hanger 39, an integral arm 40 and an upright 41, the latter having an enlargement 42 adjacent its end, forming a shoulder 43 which rests upon the axle 2, the reduced end 44 passing through the bracket opening 45 in the axle. In the housing 29 is journaled a shaft 46, one end of which projects outside of said housing, and on this projecting end is mounted a gear wheel 47 adapted to mesh with the gear wheel 20 carried by the hub of the wheel 4. Upon the shaft 46 within the housing is mounted a seed wheel 48 having a number of cavities or seed pockets 49 formed in its periphery, which are scoop shape, so that the seeds may be readily picked up at the bottom of the housing 29 and carried over to the opening 50 in the rear wall of the housing at which point the seeds pass into the chute or conveyer 51 which is pivoted to the housing as at 52, and said chute is provided with a projection 53 having a slot 54 therein, through which passes the adjusting bolt 55, the latter being threaded into the housing. This construction permits of the chute being adjusted, so that the seeds may be sown in the deepest portion of the furrow, or they may be dropped on the side of the furrow, thus regulating the depth at which the seeds are sown.

In practice the gear wheel 47 is thrown out of mesh with the gear wheel 20 by moving the lever 24 to the position shown by dotted lines in Fig. 2, then a number of furrows are made with the plow. After the right number of furrows are made, the gear wheel 47 is thrown into mesh with the gear wheel 20 and the balance of the field plowed in the ordinary manner, and as each additional furrow is made the preceding furrow in which the seeds are being dropped is filled with the soil from the succeeding furrow.

The depth of the furrow may be regulated by adjusting the socket plate 9, so as to raise or lower the front end of the plow beam 14, and the plow may be put in a straight line because of the pivoted socket 13, even though the axle 2 should be thrown at different angles as when passing over rocks or other obstructions.

Of course I do not wish to be limited to the exact details of construction as here shown as these may be varied within the limits of the appended claims without departing from the spirit of my invention.

Having thus fully described my invention, what I claim as new and useful, is—

1. In combination with an axle, wheels journaled thereon, a bracket carried by the axle projecting upwardly and extending over one of the wheels, a gear wheel mounted upon the wheel over which the bracket extends, a hopper, a housing carried thereby, a shaft journaled in said housing carrying means for distributing the seeds, a gear wheel also mounted on said shaft outside of the housing adapted to mesh with the first named gear wheel, a plate carried by the outer end of the axle, a lever pivoted to said plate and to the hopper, and a chute leading from the housing.

2. In combination with an axle having wheels journaled thereon one of which is provided with a gear wheel, means carried by said axle for receiving a plow beam, a bracket carried by the axle projecting upwardly and extending over the wheel carrying the gear wheel, a hopper swingingly mounted upon the bracket, said hopper having an opening at its lower end normally closed by an adjustable slide, a housing secured to the lower end of the hopper and in communication therewith through said opening, said housing having a chute opening, an adjustable chute leading from said chute opening, a shaft mounted in the housing, a seed wheel mounted on said shaft within the housing, said seed wheel being provided with seed cavities, a gear wheel mounted on the outer end of said shaft adapted to mesh with the first named gear wheel and means for swinging the lower end of the hopper, whereby the gear wheels carried by the hopper may be moved into or out of operative position.

In testimony whereof, I have hereunto affixed my signature in the presence of two subscribing witnesses.

JOSEPH BAHNER.

Witnesses:
 MAX SCHERMER,
 DAVID KRAMER.